US009977457B2

(12) United States Patent
Gomolko et al.

(10) Patent No.: US 9,977,457 B2
(45) Date of Patent: May 22, 2018

(54) FLIGHT CONTROL DEVICE FOR AN AIRCRAFT

(71) Applicant: SAGEM DEFENSE SECURITE, Boulogne Billancourt (FR)

(72) Inventors: Oleg Gomolko, Boulogne Billancourt (FR); Thibaut Leblic, Boulogne Billancourt (FR); Vincent Pascal, Boulogne Billancourt (FR); Eric Francois, Boulogne Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 238 days.

(21) Appl. No.: 15/029,855

(22) PCT Filed: Oct. 1, 2014

(86) PCT No.: PCT/EP2014/071029
§ 371 (c)(1),
(2) Date: Apr. 15, 2016

(87) PCT Pub. No.: WO2015/055434
PCT Pub. Date: Apr. 23, 2015

(65) Prior Publication Data
US 2016/0252926 A1    Sep. 1, 2016

(30) Foreign Application Priority Data
Oct. 15, 2013  (FR) .................................... 13 60034

(51) Int. Cl.
*G05G 9/047*  (2006.01)
*B64C 13/04*  (2006.01)
(Continued)

(52) U.S. Cl.
CPC ............. *G05G 9/047* (2013.01); *B64C 13/04* (2013.01); *G05G 1/04* (2013.01); *G05G 5/03* (2013.01); *G05G 2009/04766* (2013.01)

(58) Field of Classification Search
CPC ....................................................... G05G 9/047
(Continued)

(56) References Cited

U.S. PATENT DOCUMENTS 5,265,827 A * 11/1993 Gerhardt ............... B64C 39/005
244/20

FOREIGN PATENT DOCUMENTS

EP    0095699 A2   12/1983
EP    0565757 A1   10/1993
(Continued)

*Primary Examiner* — David S Luo
(74) *Attorney, Agent, or Firm* — Muncy, Geissler, Olds & Lowe, P.C.

(57) ABSTRACT

The invention relates to a device comprising a lever associated with a stand carrying a rocker connected to the stand by a pivot connection about a first axis, the lever being connected to the rocker by a pivot connection about a second axis, a first transmission shaft with a first connection mechanism connecting the lever to the first transmission shaft, and a second transmission shaft with a second connection mechanism connecting the control lever to the second shaft. The first shaft and the first connection mechanism being connected by a pivot connection about a fifth axis that is inclined relative to the first axis and to the third axis, and the second shaft and the second connection mechanism are connected by a pivot connection about a sixth axis that is inclined relative to the second axis and to the fourth axis.

11 Claims, 20 Drawing Sheets

(51) Int. Cl.
*G05G 5/03* (2008.04)
*G05G 1/04* (2006.01)

(58) Field of Classification Search
USPC .................................................. 318/628, 560
See application file for complete search history.

(56) References Cited

FOREIGN PATENT DOCUMENTS

| | | | |
|---|---|---|---|
| EP | 2113818 | A2 | 11/2009 |
| EP | 2586702 | A2 | 5/2013 |
| WO | WO 2007132267 | A1 | 11/2007 |

\* cited by examiner

US 9,977,457 B2

FLIGHT CONTROL DEVICE FOR AN AIRCRAFT

The invention relates to a flight control device for an aircraft.

TECHNOLOGICAL BACKGROUND OF THE INVENTION

Flight control devices for aircraft usually comprise a control lever that is pivotally mounted on a stand of the control device to pivot about at least two mutually orthogonal axes of rotation so as to enable to control roll and pitching movements of the aircraft.

For this purpose, the control lever is mechanically or electrically connected to one or more piloting members of the aircraft such as control surfaces. Movements of the control lever are thus relayed either directly to said piloting members or else they are relayed to members for controlling said piloting members, with movements of the control lever then being converted into position information relative to the roll and pitching axes, with this information then being sent to the control members.

In order to assist the pilot, such a flight control device may also generate force return when the pilot manipulates the lever. Force return is generally defined by a threshold (i.e. the force exerted on the lever by the pilot must exceed the threshold in order for force return to be generated) and by a force relationship (representing the opposing force that should be generated by the force return as a function of the angle of inclination of the control lever, with the opposing force increasing with increasing angle of inclination of the control lever).

By way of example, both spring systems (passive systems) and electromechanical systems (active systems) are known for generating force return on the control lever.

By way of example, Document FR-A-2 954 835 discloses a control device including two actuators associated with the control lever in order to simulate force return for each movement in rotation of the lever relative to the stand.

Nevertheless, the actuators are then directly incorporated in the stand of the control device, such that the device becomes bulky. This is particularly troublesome in aircraft having cockpits of small size, such as helicopters that include a cockpit door, or indeed business jets or regional jets, since the control device can then become difficult to incorporate in the cabin.

OBJECT OF THE INVENTION

An object of the invention is to propose an improved flight control device that is easier to install in cockpits.

BRIEF SUMMARY OF THE INVENTION

In order to achieve this object, there is provided a flight control device for an aircraft, the device comprising a control lever associated with a stand carrying:
- a rocker connected to the stand via a first pivot connection about a first axis, the control lever being connected to the rocker by a second pivot connection about a second axis that is substantially perpendicular to and intersects the first axis;
- a first transmission shaft pivotally mounted relative to the stand to pivot about a third axis and connected to at least a first control motor member separate from the stand;
- a first connection mechanism connecting the control lever to the first transmission shaft in such a manner that a movement in rotation of the control lever about the first axis produces a movement in rotation of the first shaft about the third axis;
- a second transmission shaft pivotally mounted relative to the stand to pivot about a fourth axis and connected to at least one second control motor member separate from the stand; and
- a second connection mechanism connecting the control lever to the second shaft so that a movement in rotation of the control lever about the second axis produces a movement in rotation of the second shaft about the fourth axis.

The first shaft and the first connection mechanism are connected to each other by a pivot connection about a fifth axis that is inclined relative to the first axis and to the third axis; and the second shaft and the second connection mechanism are connected to each other by a pivot connection about a sixth axis that is inclined relative to the second axis and to the fourth axis.

Thus, by means of the angle of inclination between the first shaft and the first connection mechanism and between the second shaft and the second connection mechanism, it is possible to adapt the position of the third axis and of the fourth axis relative to the stand of the control device. It is thus possible to position the transmission shafts in appropriate manner in the control device so that the control device can be arranged easily in a cockpit, even one of small size. In particular, the control motor members are thus separate from the stand and their positions relative to the stand can also be adapted to the cockpit under consideration.

Furthermore, there thus exists an angle between the third axis and the first axis and between the fourth axis and the second axis such that a reduction ratio is directly created between a movement in rotation of the first transmission shaft about the third axis and a movement in rotation of the control lever about the first axis, and also a reduction ratio is thus directly created between a movement in rotation of the second transmission shaft about the fourth axis and a movement in rotation of the control lever about the second axis. These reduction ratios can also be selected by selecting a particular configuration for the connection mechanisms and/or the transmission shafts so as to adapt the angles of inclination of the fifth axis and of the sixth axis. The device can thus omit dedicated reduction means.

In the present application, the term "an axis R inclined relative to an axis S" should be understood as meaning that the axis R is neither parallel to nor perpendicular to the axis S.

BRIEF DESCRIPTION OF THE DRAWINGS

The invention can be better understood in the light of the following description of non-limiting embodiments of the invention made with reference to the accompanying figures, in which.

DETAILED DESCRIPTION OF THE INVENTION

Figure 1:
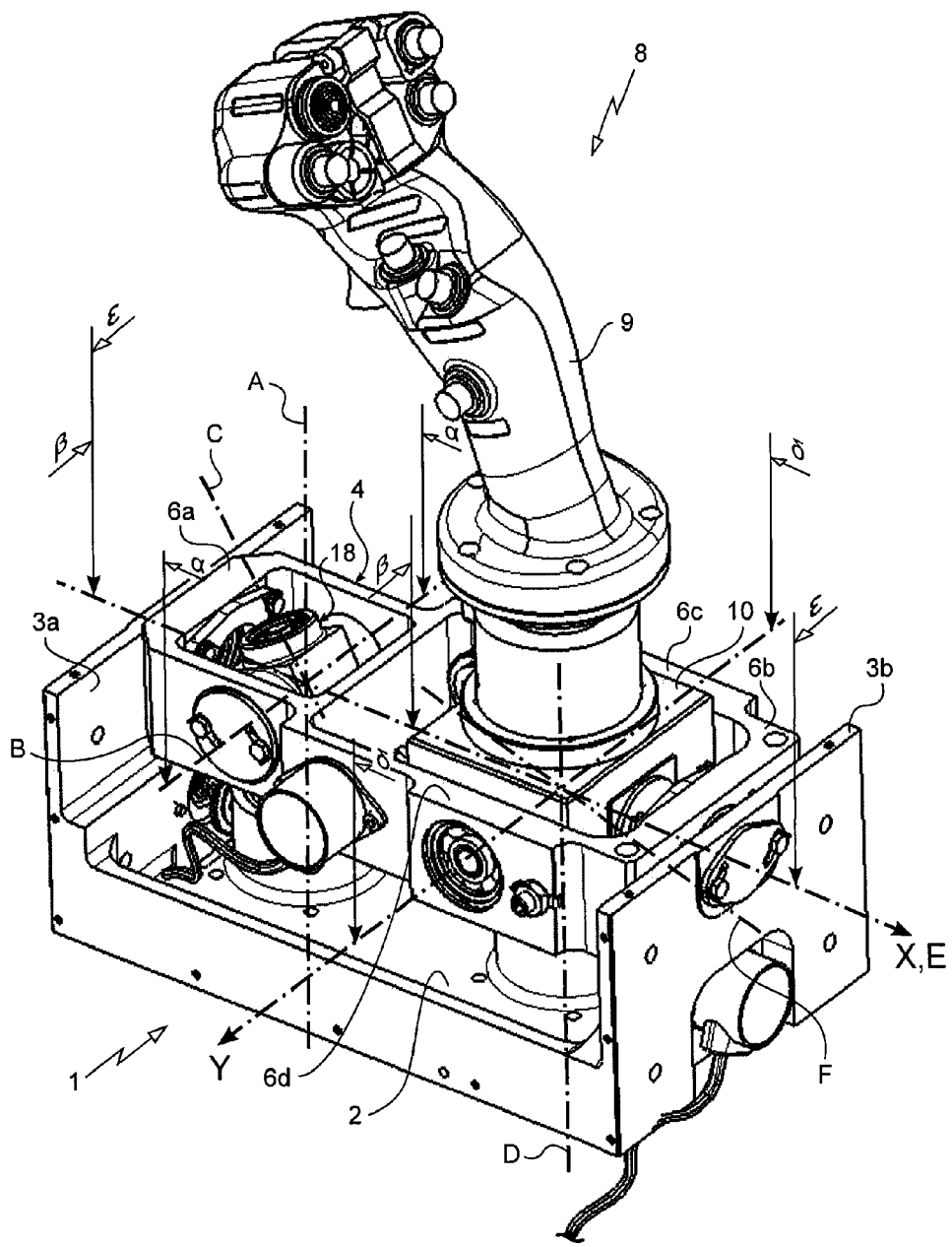
FIG. 1 is a perspective view of a flight control device in a first embodiment of the invention.
Figure 2:
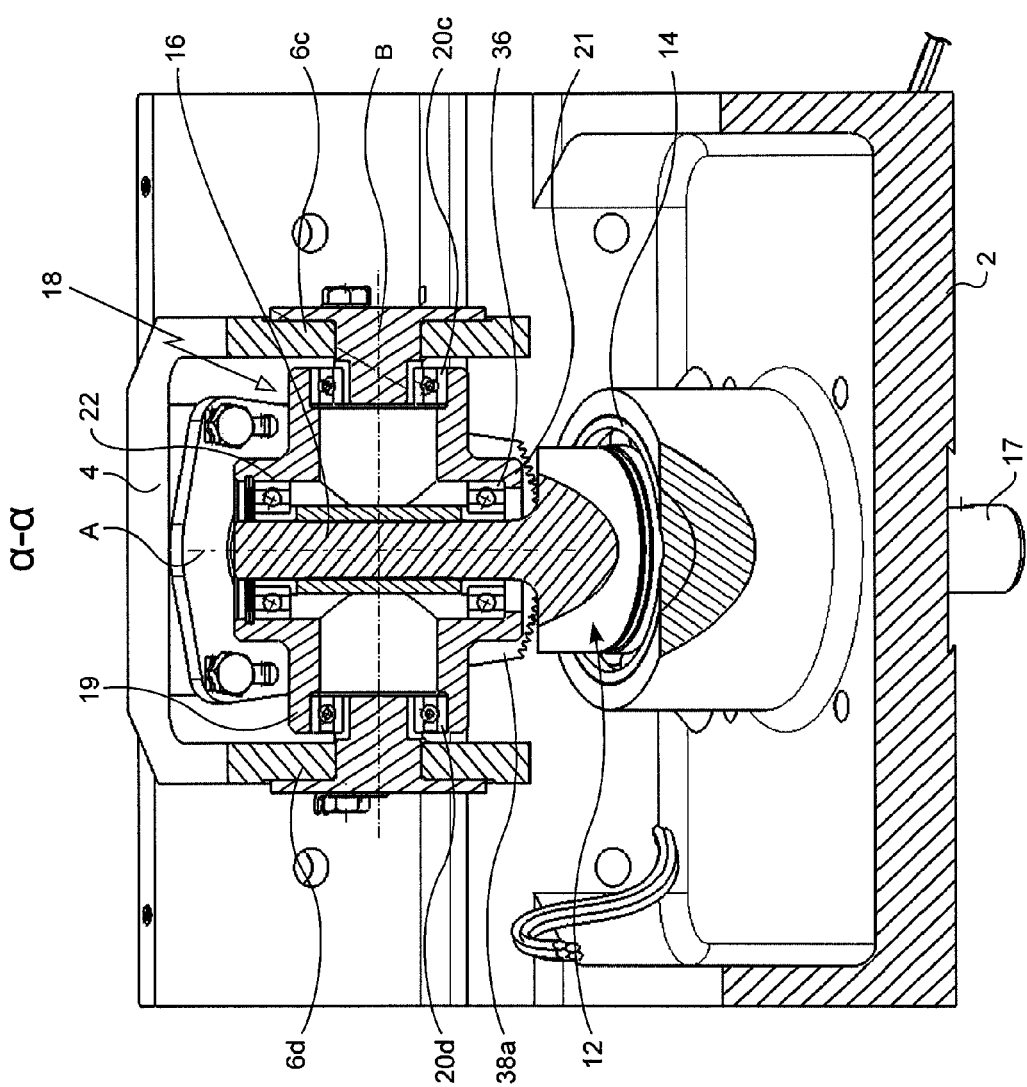
FIG. 2 is a section view of the device shown in FIG. 1 on a section plane containing the axes B and C shown diagrammatically in FIG. 1.
Figure 3:
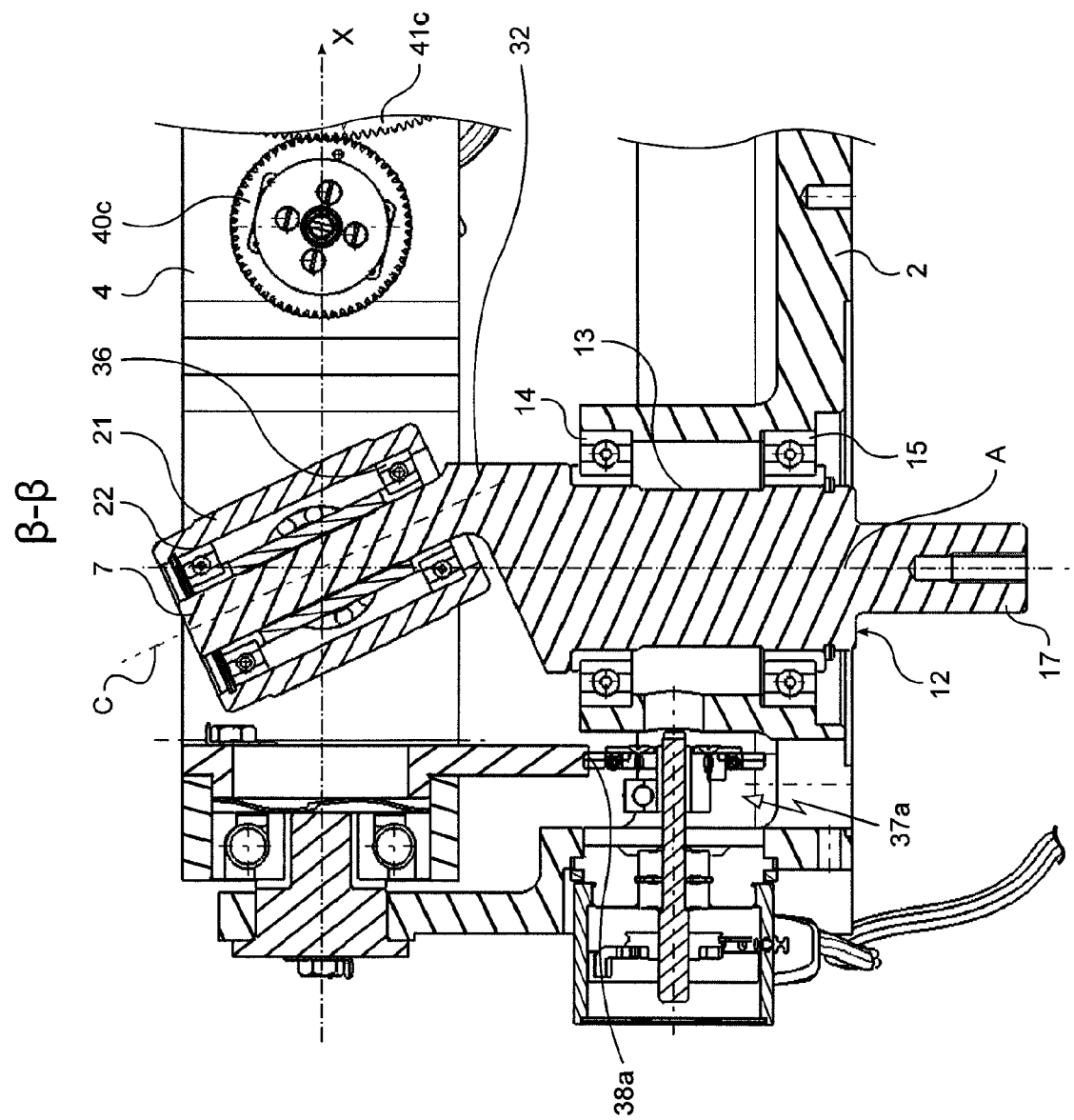
FIG. 3 is a fragmentary longitudinal section view of the device shown in FIG. 1 on a section plane containing the axes X and A shown diagrammatically in FIG. 1.
Figure 4:
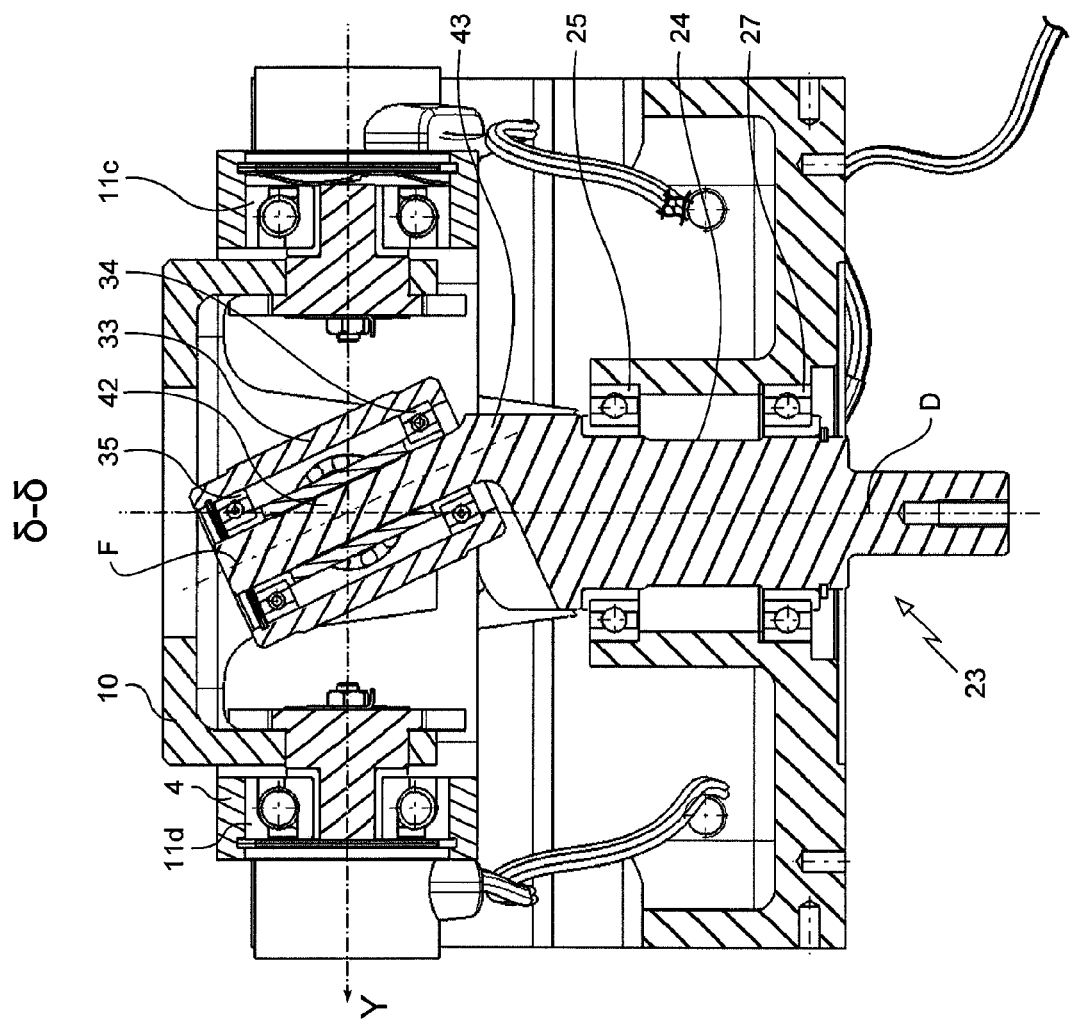
FIG. 4 is another cross-section view of the device shown in FIG. 1, the stick of the control lever of the device not being shown, the section being on a section plane containing the axes Y and D shown diagrammatically in FIG. 1.
Figure 5:
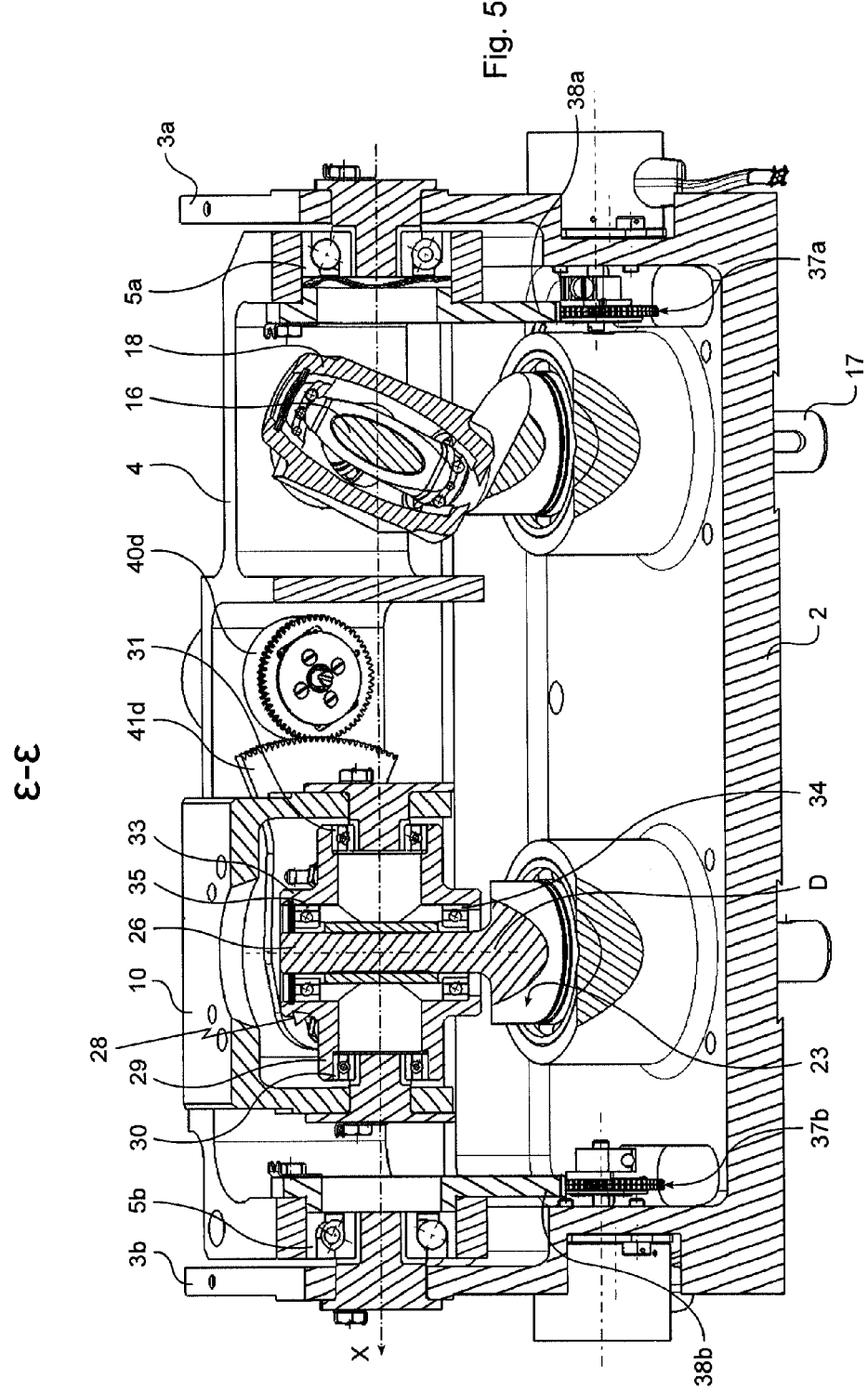
FIG. 5 is another section view of the device shown in FIG. 1, the stick of the control lever of the device not being shown, the section being on a section plane containing the axes X and F shown diagrammatically in FIG. 1.
Figure 6:
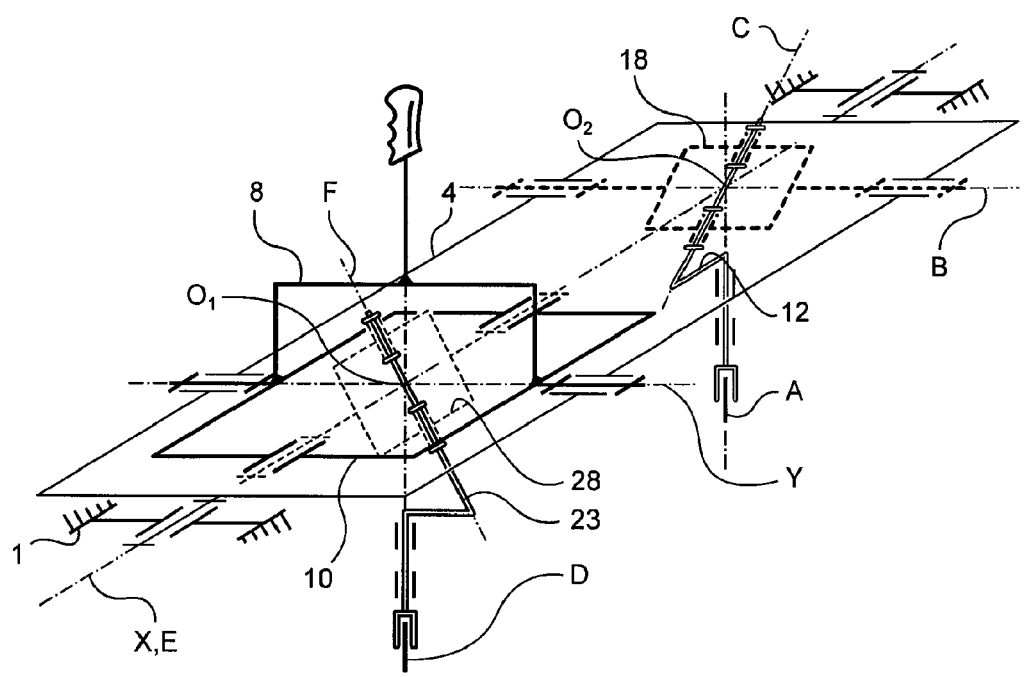
FIG. 6 is a kinematic diagram of the flight control device shown in FIG. 1.
Figure 7:
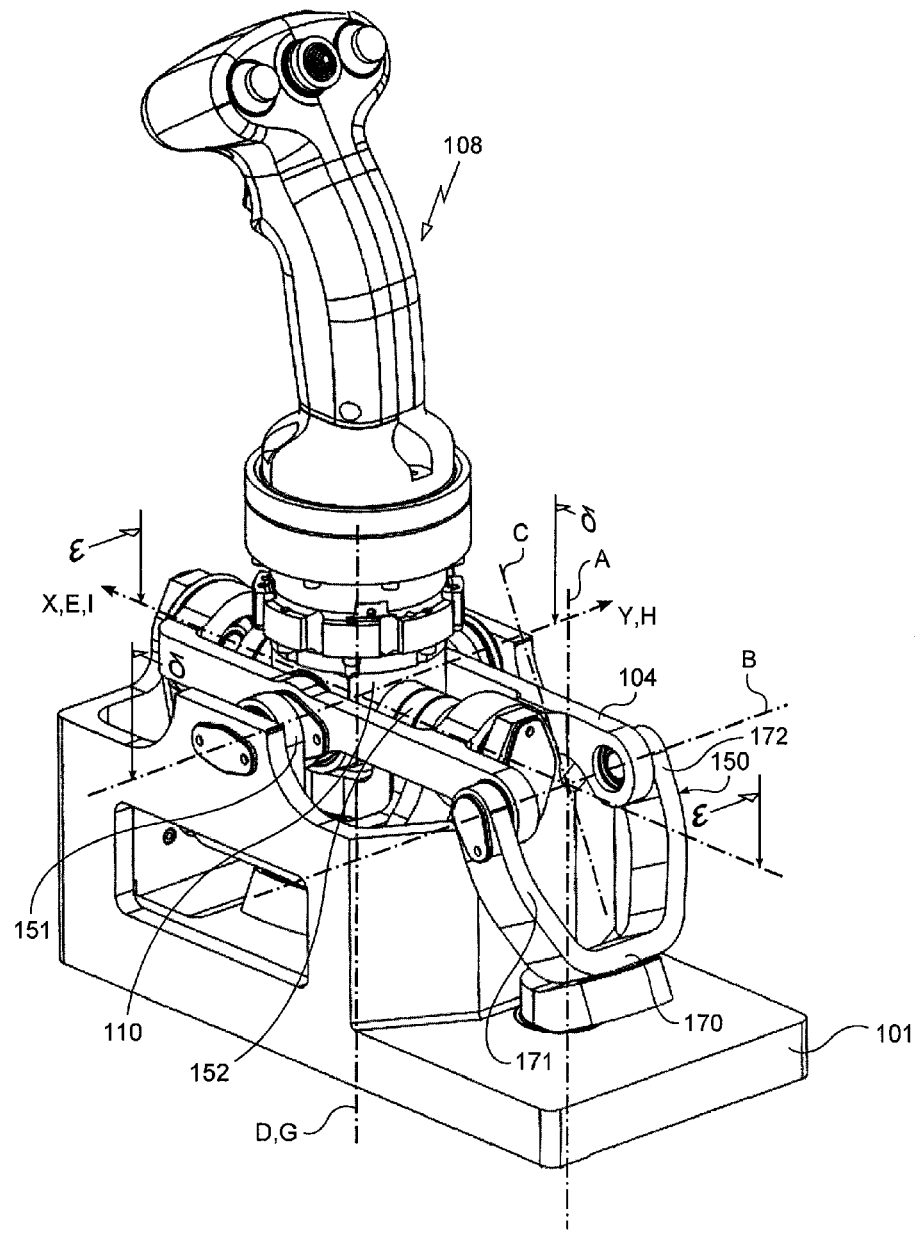
FIG. 7 is a perspective view of a flight control device in a second embodiment of the invention.
Figure 8:
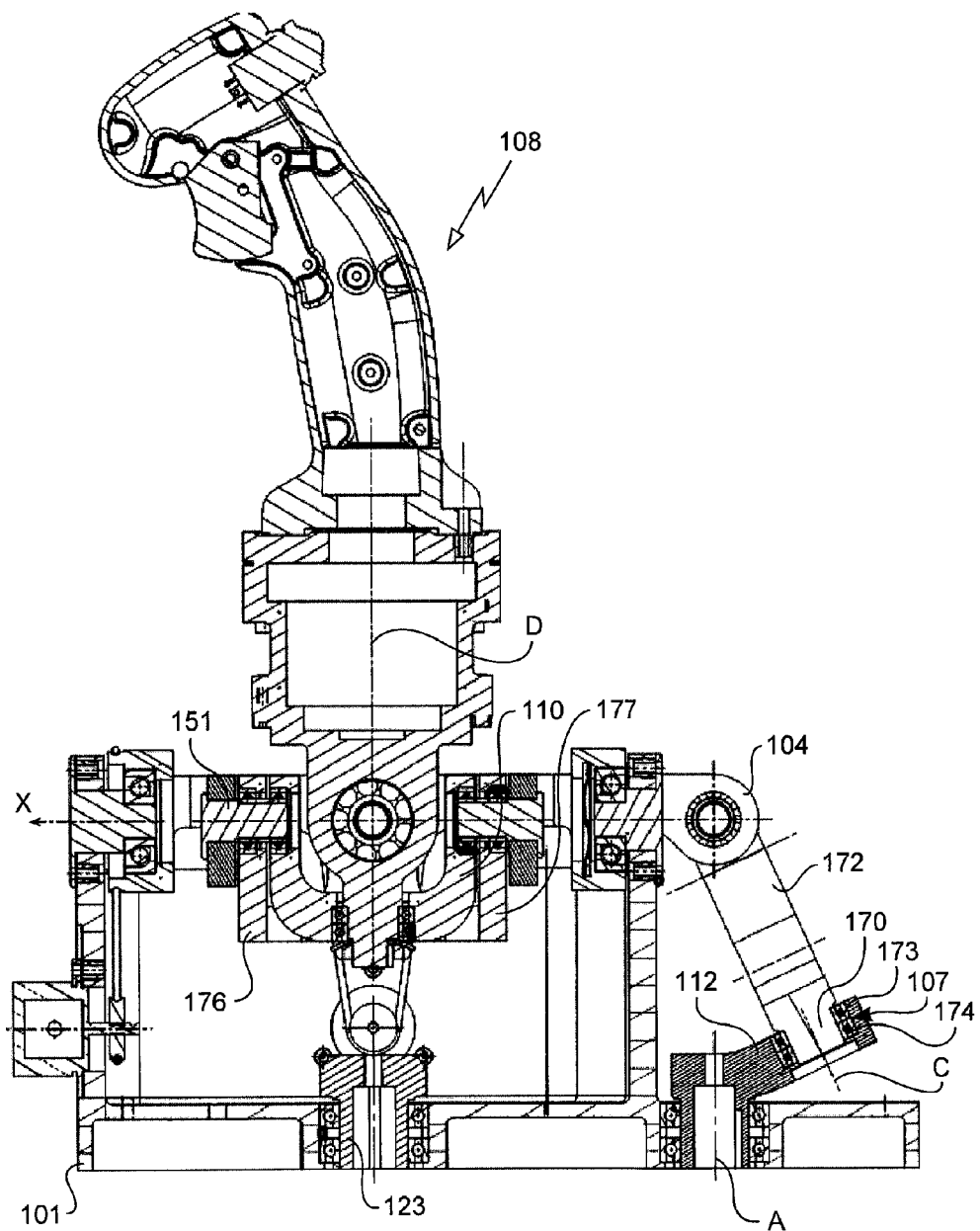
FIG. 8 is a longitudinal section view of the device shown in FIG. 7 on a section plane containing the axes X and D shown diagrammatically in FIG. 7.
Figure 9:
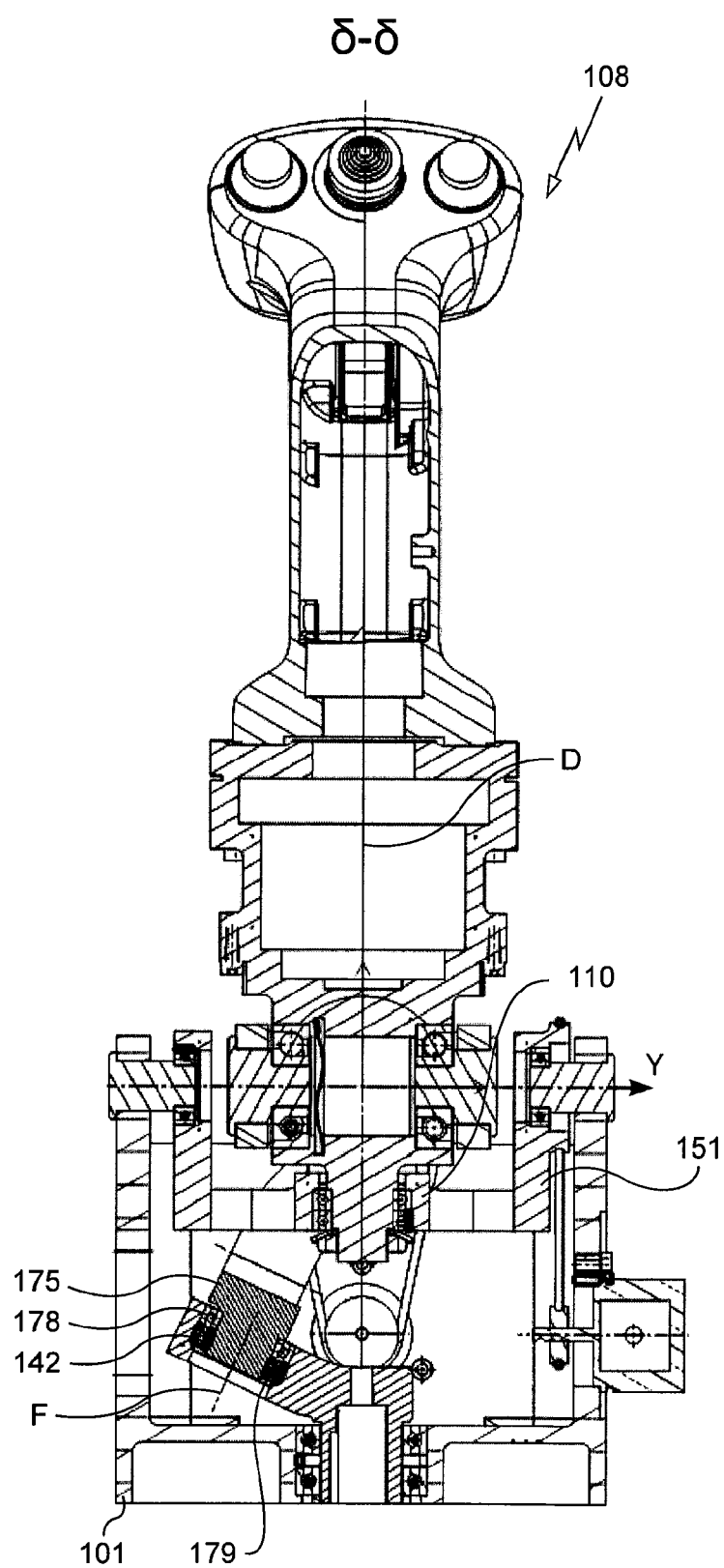
FIG. 9 is a cross-section view of the device shown in FIG. 7 on a section plane containing the axes D and Y shown diagrammatically in FIG. 7.
Figure 10:
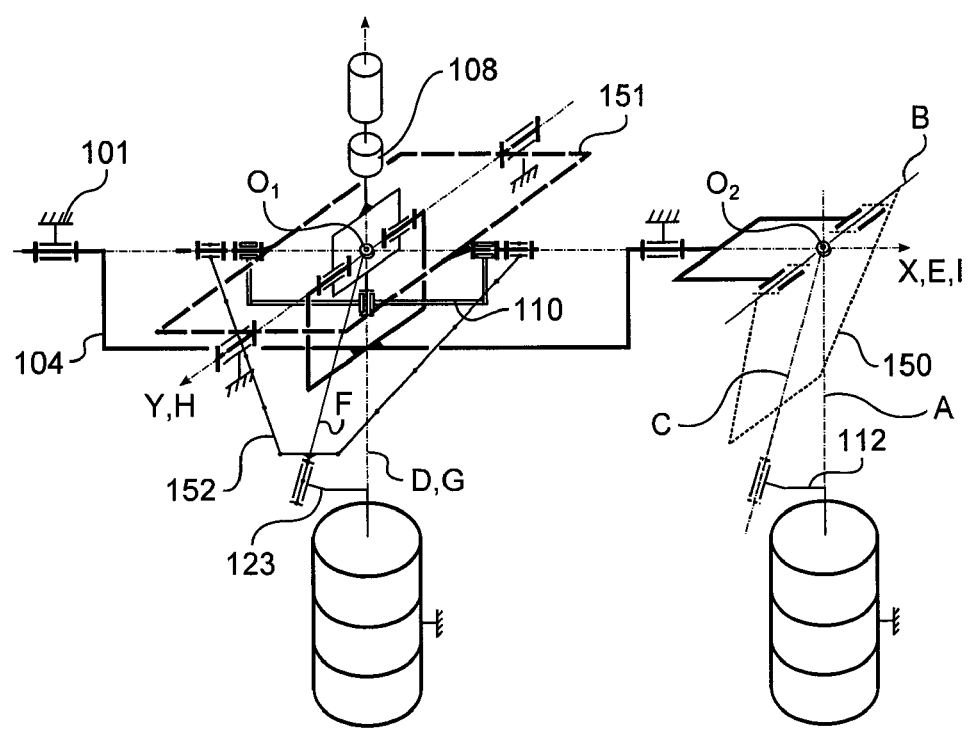
FIG. 10 is a diagram of the flight control device shown in FIG. 7, with the motor groups to which the transmission shafts are connected also being shown.

With reference to FIGS. 1 to 6, the flight control device in the first embodiment of the invention has a stand 1. In particular manner, the stand 1 extends longitudinally and includes a floor 2 and front and rear transverse walls 3a and 3b opposite each other and both extending vertically from the floor 2.

The device further comprises a first rocker 4 which in this example is generally in the form of an elongate frame having substantially the same length as the stand 1. The first rocker 4 is connected directly to the stand 1 via a first pivot connection about a first axis of rotation X. For this purpose, the first rocker 4 is mounted on the stand 1 via two rolling bearings 5a and 5b mounted on that axis on the opposite transverse walls 3a, 3b of the stand 1. The first rocker 4 thus has two transverse walls 6a, 6b parallel to the transverse walls 3a, 3b of the stand 1, and two longitudinal walls 6c, 6d extending between the transverse walls 6a, 6b of the first rocker 4.

The device also has a control lever 8 that is associated with the stand 1 and that, in this example, comprises a stick 9 forming a free end of the control lever and a second rocker 10 that, in this example, is made integrally with the stick 9.

The control lever 8 is directly connected to the first rocker 4 via a second pivot connection about a second axis of rotation Y, the second axis Y being perpendicular to the first axis X and intersecting it. For this purpose, the second rocker 10 of the control lever 8 is mounted on the first rocker 4 via two rolling bearings 11c, 11d on that axis and secured respectively to the opposite longitudinal walls 6c, 6d of the first rocker 4. It should be observed that the second axis Y is tied to the first rocker 4, i.e. pivoting of the first rocker 4 about the first axis X produces pivoting of the second axis Y about the first axis X.

The device has a first transmission shaft 12 directly connected to the stand 1 via a third pivot connection about a third axis of rotation A. For this purpose, the first transmission shaft 12 extends in part inside a hole 13 in the floor 2 of the stand 1 and is pivotally mounted in the hole 13 via two rolling bearings 14, 15 on the same axis.

The first transmission shaft 12 in this example is arranged in such a manner that the third axis A intersects the first axis X. The first transmission shaft 12 in this example is also arranged so that the third axis A is normal to a plane containing the first axis X and the second axis Y when the control lever 8 is in a neutral position (i.e. when the plane containing the first axis X and the second axis Y is parallel to the floor 2).

The first shaft 12 has a first end 16. The first end 16 comprises a rectilinear terminal portion 7 and an angled portion 32 connecting the rectilinear terminal portion 7 to the second end 32 of the second shaft. The rectilinear terminal portion 7 of the first end 16 thus extends obliquely relative to the third axis A and to the second end 17 of the second transmission shaft 12.

The second end 17 of the first shaft 12 is connected to a first motor group (not shown) that is separate from the stand. In particular, the first motor group comprises three electric motors having a common stator, a common outlet shaft, but one respective rotor each. The rotor of each motor is thus mounted on the common outlet shaft in such a manner that each motor can act individually to drive rotation of the common outlet shaft. The second end 17 of the transmission shaft may for example include internal fluting that co-operates with corresponding fluting of the first outlet shaft of the motor. The first transmission shaft 12 is thus connected to the outlet shaft of the first motor group.

The device also has a first connection mechanism connecting the control lever to the first transmission shaft 12 in such a manner that a movement in rotation of the control lever 8 about the first axis X produces a movement in rotation of the first transmission shaft 12 about the third axis A.

Preferably, as in this example, the first connection mechanism includes a first cross 18 having two branches that extend perpendicularly to each other.

In particular manner, the first connection mechanism is connected directly to the first rocker 4 by a fourth pivot connection having a fourth axis of rotation B. For this purpose, a first end of the first branch 19 of the first cross 18 is mounted on one of the longitudinal walls 6 of the first rocker 4 via a first rolling bearing 20d secured to said longitudinal wall 6d, and the second end of the first branch 19 of the first cross 18 is mounted on the other longitudinal wall 6c of the first rocker 4 via a second rolling bearing 20c that is secured to said longitudinal wall 6c, the first and second rolling bearings 20d and 20c being on a common axis. As a result, the first branch 19 extends transversely within the first rocker 4 between the two longitudinal walls 6c and 6d of the first rocker 4.

The first cross 18 is arranged in such a manner that the fourth axis B is concurrent with the first axis X and the third axis A, and extends parallel to the second axis Y.

The second branch 21 of the first cross 18 in this example has a central hole extending over the entire length of the second branch 21. The first transmission shaft 12 is directly connected to the first cross 18 by a fifth pivot connection about a fifth axis of rotation C. For this purpose, the rectilinear terminal portion 7 of the first transmission shaft 12 extends inside the second branch 21 and is pivotally mounted in the central hole of the second branch 21 via two rolling bearings 22 and 36 on the same axis.

In the invention, the device is arranged in such a manner that the fifth axis C is inclined relative to the first axis X and to the third axis A, and intersects the first axis X, the second axis Y, and the third axis A. The first transmission shaft 12 in this example is shaped in such a manner that the rectilinear terminal portion 7 extends at 25 degrees relative to the second end 17 of the first transmission shaft 12, with the fifth axis C thus extending in this example at 25 degrees relative to the third axis A.

Because of the particular angled shape of the first transmission shaft 12, it is thus possible to allow a pivot connection between the first shaft 12 and the first connection mechanism that has its axis inclined, in particular relative to the first axis X and to the third axis A.

The transmission of torque between the control lever 8 and the first transmission shaft 12 thus takes place via the first rocker 4 and the first cross 18. When the control lever 8 is moved by the pilot about the first axis of rotation X, the first rocker 4 is also driven in rotation relative to the stand 1 about the first axis of rotation X, thereby acting via the connection created by the first cross 18 to drive a movement in rotation of the first transmission shaft 12 about the third axis A.

The device has a second transmission shaft 23 directly connected to the stand 1 by a sixth pivot connection about a sixth axis of rotation D. For this purpose, the second transmission shaft 23 extends in part inside a hole 24 in the floor 2 of the stand 1 and is pivotally mounted in the hole 24 by means of two rolling bearings 25 and 27 on a common axis.

The second transmission shaft 23 in this example is arranged in such a manner that the sixth axis D intersects the first axis X and the second axis Y. The second transmission shaft 23 in this example is also arranged in such a manner that the sixth axis D is normal to the plane containing the first axis X and the second axis Y when the control lever 8 is in a neutral position (i.e. when the plane containing the first axis X and the second axis Y is parallel to the floor 2).

The sixth axis D is thus parallel to the third axis A in such a manner that the first transmission shaft 12 and the second transmission shaft 23 extend parallel to each other.

In the invention, the second shaft 23 has a first end 26. The first end 26 has a rectilinear terminal portion 42 and an angled portion 43 connecting the rectilinear terminal portion 42 to the second end 26 of the second shaft 23. The rectilinear terminal portion 42 of the first end 26 thus extends obliquely relative to the sixth axis D and to the second end 26.

The second end 26 of the second shaft 23 is connected to a second motor group (not shown) that is separate from the stand. By way of example the second shaft 23 is connected to the second motor group in the same manner as the first shaft 12 is connected to the first motor group. The second motor group in this example is identical to the first motor group.

Since the third axis A and the sixth axis D are parallel, and since the outlet shafts of the first and second motor groups lie respectively on the third axis A and on the sixth axis D, the outlet shafts of the first and second motor groups are likewise parallel to each other.

As a result, the motor groups are separate from the stand 1 and are arranged so that both of them extend beneath the floor of the stand 1, one beside the other.

The device of the first embodiment is thus compact.

The device also has a second connection mechanism connecting the control lever 8 to the second transmission shaft 23 so that a movement of rotation of the control lever 8 about the second axis Y produces a movement in rotation of the second transmission shaft 23 about the sixth axis D.

Preferably, the second connection mechanism comprises a second cross 28 having two branches extending perpendicularly to each other.

In particular manner, the second connection mechanism is directly connected to the second rocker 10 by a seventh pivot connection having a seventh axis of rotation E that, in this example, coincides with the first axis of rotation X. For this purpose, a first end of the first branch 29 of the second cross 28 is mounted on one of the transverse walls of the second rocker 10 by a first rolling bearing 30, and the second end of the first branch 29 of the second cross 28 is mounted on the other transverse wall of the second rocker 10 by a second rolling bearing 31, the first and second rolling bearings 30 and 31 being on a common axis. As a result, the first branch 29 of the first cross 28 extends longitudinally in the second rocker 10 between the two transverse walls of the second rocker 10.

The second branch 33 of the second cross 28 in this example is provided with a central hole extending all along the second branch 33. The second transmission shaft 23 is directly connected to the second cross 28 by an eighth pivot connection about an eighth axis of rotation F. For this purpose, the angled first end 26 of the second transmission shaft 23 extends inside the second branch 33 and is mounted to pivot in the central hole of the second branch 33 by two rolling bearings 34 and 35 on a common axis.

According to the invention, the device is arranged in such a manner that the eighth axis F is inclined relative to the second axis Y and to the sixth axis D and intersects the first axis X, the second axis Y, and the sixth axis D. In this example, the second transmission shaft 23 is shaped in such a manner that the angled first end 26 extends at 25 degrees to the second transmission shaft 23, the eighth axis F thus extending in this example at 25 degrees relative to the sixth axis D.

Because of the particular angled shape of the second transmission shaft 23 it is thus possible to allow a pivot connection between the second shaft 23 and the second connection mechanism about an axis that is inclined in particular relative to the second axis Y and to the sixth D.

The transmission of torque between the control lever 8 and the second transmission shaft 23 thus takes place solely via the second cross 28. When the control lever 8 is moved by the pilot about the second axis of rotation Y, that acts via the connection created by the second cross 28 to drive a movement in rotation of the second transmission shaft 23 about the sixth axis D.

Thus, the device in the first embodiment of the invention has only eight pivot connections and six main elements (first transmission shaft 12, second transmission shaft 23, first cross 18, second cross 28, first rocker 4, and control lever 8), while still enabling a motor group to be associated with each movement in rotation of the control lever 8 relative to the stand 1. The device in the first embodiment of the invention is thus of structure that is simplified.

Furthermore, the various elements of the device are connected to one another solely by rolling bearings. This makes it possible to simplify the device and to make it more reliable. Specifically, by acting in this way, no use is made of gearing that might seize, or of belts that might break.

The device is preferably arranged in such a manner that the first axis X, the second axis Y, the sixth axis D, and the eighth axis F are all concurrent at a first point $O_1$, and the first axis X, the third axis X, the fourth axis B, and the fifth axis C are all concurrent at a second point $O_2$.

The various pivot axes of the device are thus concurrent at only two points $O_1$ and $O_2$, thus making it possible to have a device that is particularly compact.

According to a particular aspect of the first embodiment, in order to sense the pivoting movements of the control lever 8 about the first axis X, in order to deduce therefrom orders for controlling remote piloting members, two potentiometers 37a and 37b are carried respectively by the opposite transverse walls 3a and 3b of the stand 1. The transverse walls 6a and 6b of the first rocker 4 each carry a respective toothed segment 38a, 38b that co-operates with the inlet shaft of the potentiometer 37a, 37b of the corresponding transverse walls 3a, 3b of the stand 1, thereby enabling the potentiometers to sense the movements of the first rocker 4 and thus of the control lever 8, about the first axis X. In identical manner, in order to sense the pivoting movements of the control lever 8 about the second axis Y, in order to deduce therefrom orders for controlling remote piloting members, two potentiometers 40c, 40d are respectively arranged on the longitudinal wall 6c, 6d of the first rocker 4. Each of the longitudinal walls of the second rocker 10 carries a respective toothed segment 41d, 41d that co-operates with the inlet shaft of the potentiometer of the corresponding longitudinal walls 6c, 6d of the stand 1, thereby enabling the potentiometers to sense the movement of the second rocker 10, and thus of the control lever 8, about the second axis Y.

The movements of the control lever about the first axis X and the second axis Y are thus very easy to measure.

FIGS. 7 to 10 show a second embodiment of the invention. Elements in common with the first embodiment are given the same numbers plus one hundred.

In the second embodiment, the connection between the control lever 108 and the first transmission shaft 112 takes place as in the first embodiment: a movement in rotation of the control lever 108 about the first axis X produces a corresponding movement in rotation of the first rocker 104 about the first axis X, thereby in turn producing a movement in rotation of the first transmission shaft 112 about the third axis A via the first connection mechanism. In this example, the first connection mechanism also comprises a single part 150. In this example, the part 150 is in the form of a clevis having a base 170 and two branches 171, 172 extending symmetrically from the base 170. The first transmission shaft 112 is mounted on the base 170 via its rectilinear terminal portion 107 by means of two rolling bearings 173, 174 on a common axis. Each free end of the branches is mounted on a respective longitudinal wall of the first rocker 104 via a rolling bearing, the rolling bearings that are associated with the free ends of the branches lying on a common axis.

The first transmission shaft 112 is thus directly connected in rotation with the first connection mechanism, which is itself directly connected in rotation with the first rocker 104.

The connection between the control lever 108 and the second transmission shaft 123 is nevertheless different from the connection in the first embodiment.

In the second embodiment, the second rocker 110 is no longer secured to the control lever 108. The control lever 108 is thus directly connected to the second rocker 110 via a ninth pivot connection about a ninth axis G that is normal to the panel containing the first axis X and the second axis Y. In this example, the ninth axis G coincides with the sixth axis D.

Furthermore, the second connection mechanism is no longer directly connected in rotation with the second rocker 110. Specifically, in this example the device has a platform 151 that is directly connected to the stand 101 by a tenth pivot connection about a tenth axis of rotation H that coincides with the second axis Y. The second rocker 110 is itself directly connected to the platform 151 via an eleventh pivot connection about an eleventh axis I that coincides with the first axis X, in this example. The second connection mechanism is thus mounted directly on the platform 151 to pivot by means of the seventh pivot connection about the first axis X (instead of being pivotally mounted directly on the second rocker). The second transmission shaft 123 is nevertheless indeed pivotally mounted directly on the second connection mechanism, as in the first embodiment. In this example, the second connection mechanism also comprises a single part 152. In this example, the part 152 is in the form of a clevis having a base 175 and two branches 176, 177 extending symmetrically from the base 175. The second transmission shaft 123 is mounted on the base 175 via its rectilinear terminal portion 142 by means of two rolling bearings 178, 179 on a common axis. Each free end of the branches is mounted on a respective transverse wall of the platform 151 via a rolling bearing, the rolling bearings associated with the free ends of the branches lying on a common axis (as can be seen more clearly in FIG. 8).

Thus, a movement in rotation of the control lever 108 about the second axis Y drives a corresponding movement in rotation of the second rocker 110, which in turn drives a corresponding movement in rotation of the platform 151, which in turn drives a movement in rotation of the second transmission shaft 123 about the sixth axis D via the second connection mechanism.

Unlike the first embodiment, the device in the second embodiment of the invention enables pivoting movement of the control lever 108 about the first axis X to be completely decoupled from pivoting movement of the second transmission shaft 123 about the sixth axis D.

In addition, as in the first embodiment, the various pivot axes of the device in the second embodiment are concurrent at only two points $O_1$ and $O_2$, thereby making it possible to have a device that is particularly compact.

Figure 11:
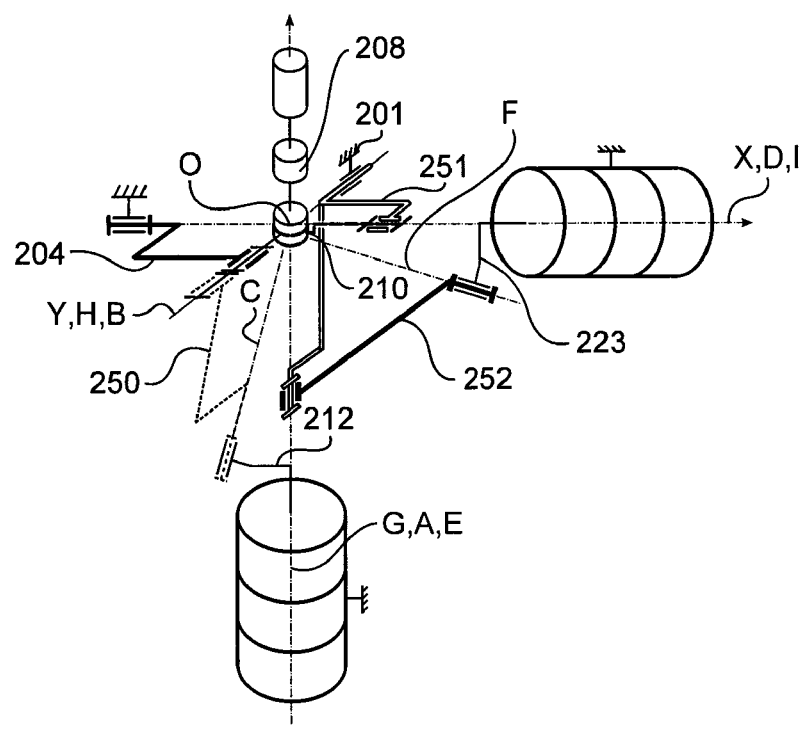
FIG. 11 is a diagram of a flight control device in a third embodiment of the invention.
Figure 12:
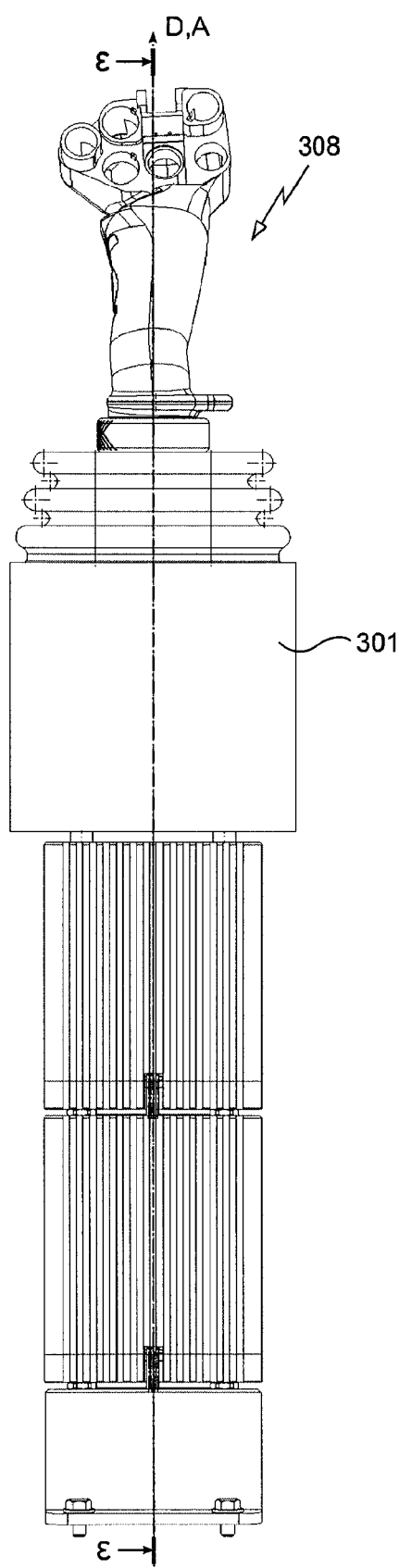
FIG. 12 is a perspective view of a flight control device in a fourth embodiment of the invention.

FIG. 11 shows a third embodiment of the invention. Elements that are common with the second embodiment are given the same numbers plus one hundred.

In this third embodiment, the second transmission shaft 223 is arranged in the device in such a manner that the sixth axis D substantially coincides with the first axis X (whereas in the first embodiment and in the second embodiment the sixth axis is normal to the plane formed by the first axis and the second axis). The second connection mechanism is thus directly mounted to pivot by the seventh pivot connection about the seventh axis E on the platform 251, the seventh axis E coinciding with the ninth axis G (instead of coinciding with the first axis X as in the second embodiment of the invention). Nevertheless, the second transmission shaft 223 is indeed pivotally mounted directly on the second connection mechanism as in the second embodiment. The second connection mechanism in this example also comprises a single part 252.

Thus, a movement in rotation of the control lever 208 about the second axis Y drives a corresponding movement in rotation of the second rocker 210, which in turn drives a corresponding movement in rotation of the platform 251, which in turn drives a movement in rotation of the second transmission shaft 223 about the first axis X via the second connection mechanism.

In addition, the first transmission shaft 212 is arranged in the device in such a manner that the third axis A substantially coincides with the ninth axis E. The first connection mechanism is thus mounted directly on the control lever 208 by the fourth pivot connection to pivot about the fourth axis B (instead of being pivotally mounted on the first rocker as in the second embodiment of the invention), the fourth axis B in this example coinciding with the second axis Y (instead of being parallel to the second axis as in the second embodiment of the invention). Nevertheless, the first transmission shaft 212 is indeed pivotally mounted directly on the first connection mechanism as in the second embodiment. In this example, the first connection mechanism also comprises a single part 250.

Thus, a movement in rotation of the control lever 208 about the first axis X directly drives a movement in rotation of the first transmission shaft 212 about the ninth axis G via the first connection mechanism.

The device of the third embodiment is arranged in such a manner that all of the axes (first axis, second axis, third axis, fourth axis, fifth axis, sixth axis, seventh axis, eighth axis, ninth axis, tenth axis, and eleventh axis) are concurrent at a single point O.

Thus, the stand 1 carrying the various main elements of the device is particularly compact.

Since the third axis A and the sixth axis D are perpendicular and since the outlet shafts of the first and second motor groups lie respectively on the third axis and on the sixth axis, the outlet shafts from the first and second motor groups are likewise mutually perpendicular.

It is thus possible to have a new configuration for the device of the invention.

As in the second embodiment, the device in the third embodiment of the invention makes it possible to decouple pivoting movement of the control lever 208 about the first axis X completely from pivoting movement of the second transmission shaft 223 about the sixth axis D.

FIGS. 12 to 15 show a fourth embodiment of the invention. Elements in common with the first embodiment are given the same numbers plus three hundred.

In this fourth embodiment, the first transmission shaft 312 is arranged in the device in such a manner that the third axis A of the first transmission shaft coincides with the sixth axis D of the second transmission shaft 323. The second transmission shaft 323 is thus mounted directly on the first transmission shaft 312 by the sixth pivot connection to pivot about the sixth axis D (instead of being pivotally mounted on the stand as in the first embodiment of the invention).

For this purpose, and in this example, the first transmission shaft 312 is provided with a central hole extending all along the first transmission shaft 312. The second transmission shaft 323 extends in part inside the first transmission shaft 312 and is mounted to pivot in the central hole of the first transmission shaft 312 by a rolling bearing 367.

In addition, in this fourth embodiment, the first connection mechanism is mounted directly on the control lever 308 by the fourth pivot connection to pivot about the fourth axis B (instead of being pivotally mounted on the first rocker as in the first embodiment of the invention), and the fourth axis B in this example coincides with the second axis Y (instead of being parallel to the second axis Y as in the first embodiment of the invention).

Nevertheless, the first transmission shaft 312 is indeed pivotally mounted directly on the first connection mechanism, as in the first embodiment. In preferred manner, the first connection mechanism comprises a single part 361 that is substantially in the form of a clevis having a base 370 and two branches 371, 372 extending symmetrically relative to the base 370. The first transmission shaft 312 is mounted by the fifth pivot connection on the base 370 via two rolling bearings 373, 374 on a common axis. Each free end of the branches is mounted by the fourth pivot connection to a respective longitudinal wall of the second rocker 310 via a rolling bearing, the rolling bearings associated with the free ends of the branches lying on a common axis.

Thus, a movement in rotation of the control lever 308 about the first axis X directly drives a movement in rotation of the first transmission shaft 312 about the third axis A by means of the first connection mechanism.

The connection between the control lever 308 and the second transmission shaft is provided as in the first embodiment: a movement in rotation of the control lever 308 about the second axis Y directly drives a movement in rotation of the second transmission shaft 323 about the sixth axis D via the second connection mechanism. In preferred manner, the second connection mechanism in this example comprises a cross 362 having two branches that extend perpendicularly to each other as in the first embodiment. Thus, the first branch 365 of the second cross 362 is mounted on the second platform 310 via two rolling bearings on a common axis, and the angled first end 326 of the second transmission shaft 323 extends inside the second branch 366 and is mounted to pivot by means of two rolling bearings on a common axis.

The device of the fourth embodiment is arranged in such a manner that all of the axes (first axis, second axis, third axis, fourth axis, fifth axis, sixth axis, seventh axis, and eighth axis) are all concurrent at a single point O.

Thus, the stand 301 carrying the various main elements of the device is particularly compact.

Since the third axis and the sixth axis coincide, and since the outlet shafts of the first motor group and of the second motor group lie respectively on the third axis and on the sixth axis, the outlet shafts of first and second motor groups likewise lie on the same axis.

As a result, the motor groups are separate and arranged in such a manner that both of them extend one below the other under the stand 301.

The device in the fourth embodiment makes it possible for the motor groups to be arranged in a novel manner relative to the stand 301, with this also being a configuration that is particularly compact.

Like the device in the first embodiment of the invention, the device of the fourth embodiment of the invention has eight pivot connections and six main elements (first transmission shaft 312, second transmission shaft 323, first lever 361, second lever 362, first rocker 304, and control lever 308), while enabling one motor group to be associated with each movement in rotation of the control lever relative to the stand. The device in the fourth embodiment is thus of a structure that is simplified.

In particular manner, as in the first embodiment, in order to sense pivoting movements of the control lever 308 about the first axis X so as to deduce control orders for remote piloting members, two potentiometers 337a, 337b are carried respectively by the opposite transverse walls 303a, 303b of the stand 301. Each of the transverse walls 306a, 306b of the first rocker 304 carries a respective toothed segment 338a, 338b that co-operates with the inlet shaft of the potentiometer 337a, 337b of the corresponding transverse wall 303a, 303b of the stand 301, thus enabling the potentiometers to sense the movement of the first rocker 304, and thus of the control lever 308, about the first axis X. In identical manner, in order to sense the pivoting movements of the control lever 308 about the second axis Y so as to deduce therefrom control orders for remote piloting members, two potentiometers 340d (only one of which is shown) are arranged respectively on the longitudinal walls 306d of the first rocker 304. Each of the longitudinal walls of the second rocker 310 carries a respective toothed segment 341d (only one of which is shown) that co-operates with the inlet shaft of the potentiometer of the corresponding longitudinal wall 306d of the first rocker 304, thereby enabling the potentiometers to sense the movement of the second rocker 310, and thus of the control lever 308, about the second axis Y.

Figure 16:
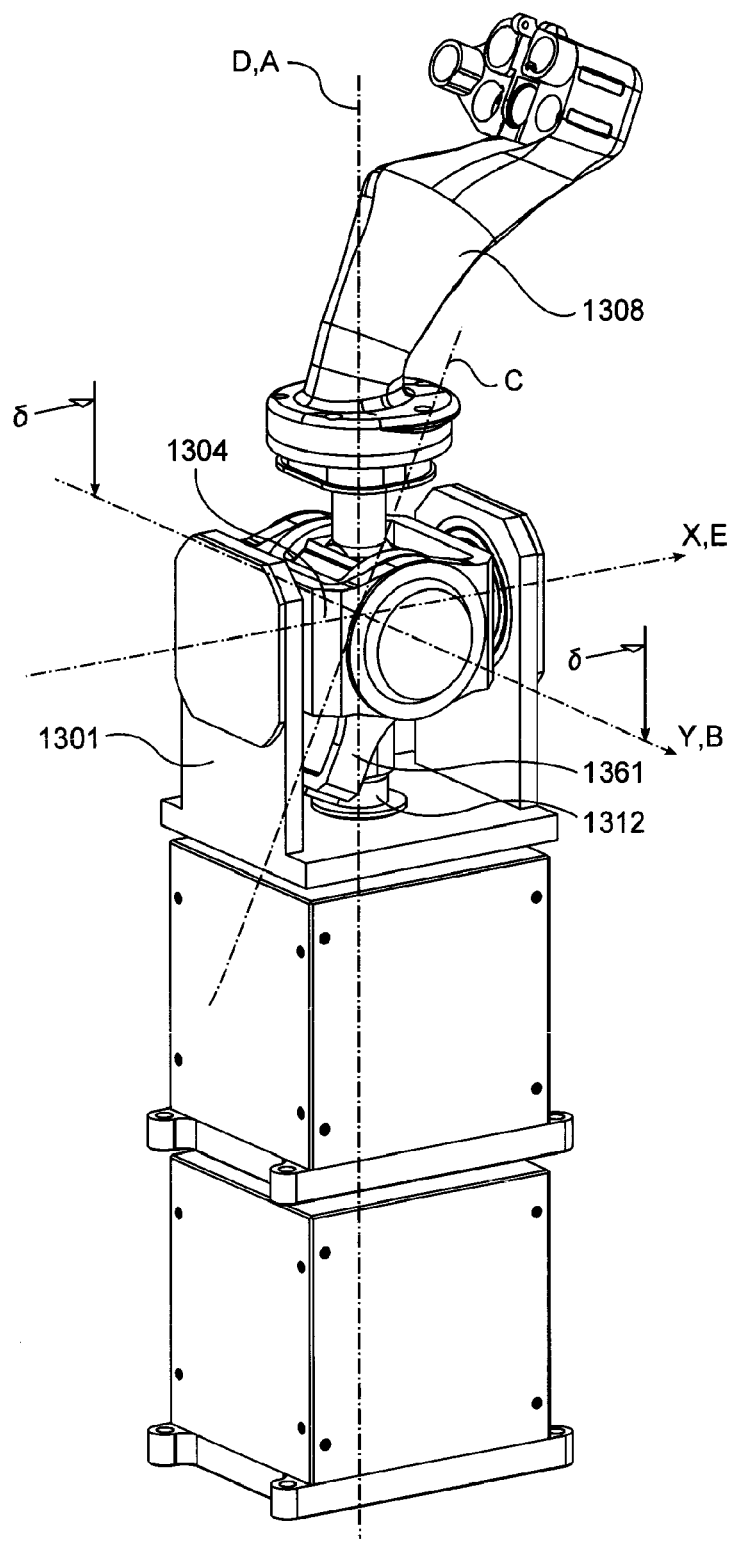
FIG. 16 is a perspective view of a variant of the flight control device in the fourth embodiment of the invention.
Figure 17:
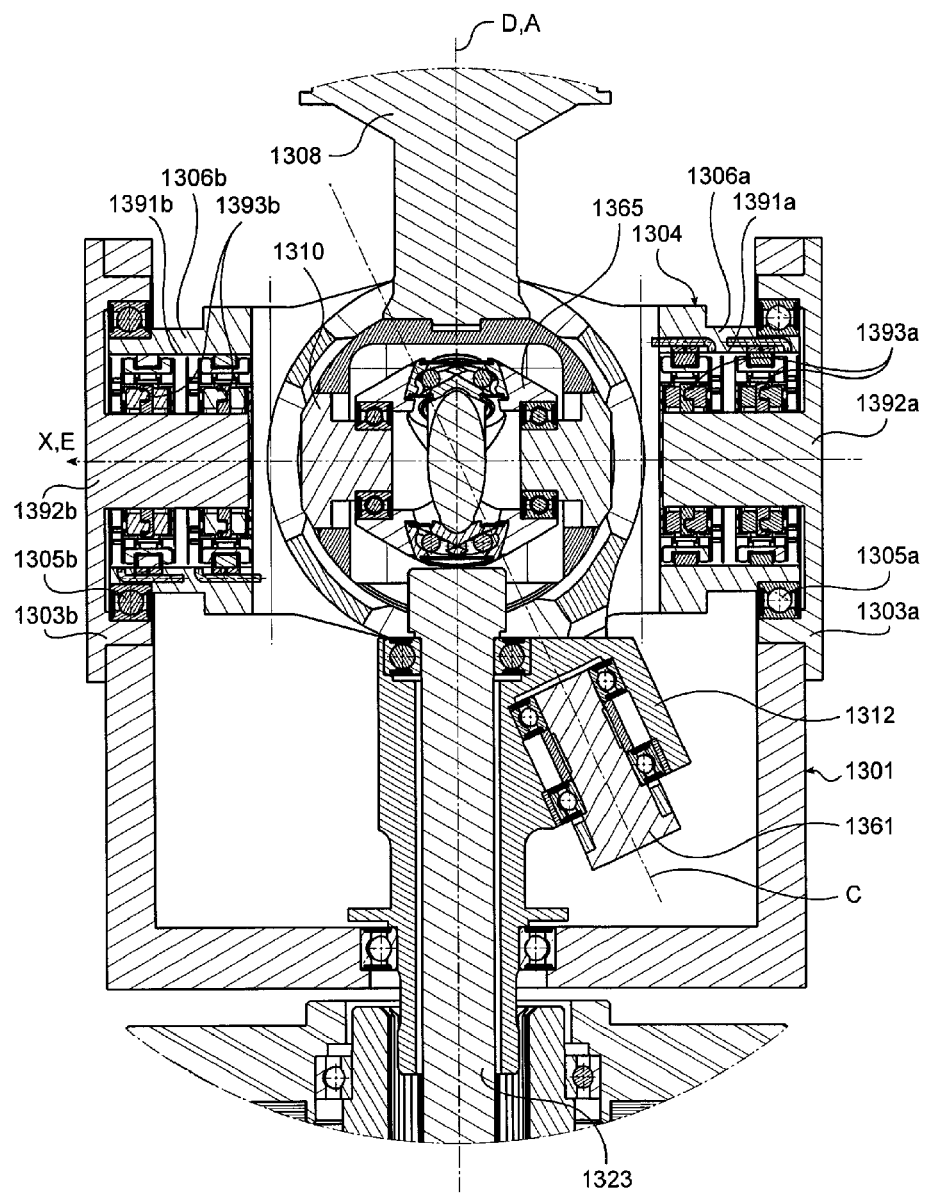
FIG. 17 is a fragmentary plurality section view of the device shown in FIG. 16 on a section plane containing the axes X and D shown diagrammatically in FIG. 16.
Figure 18:
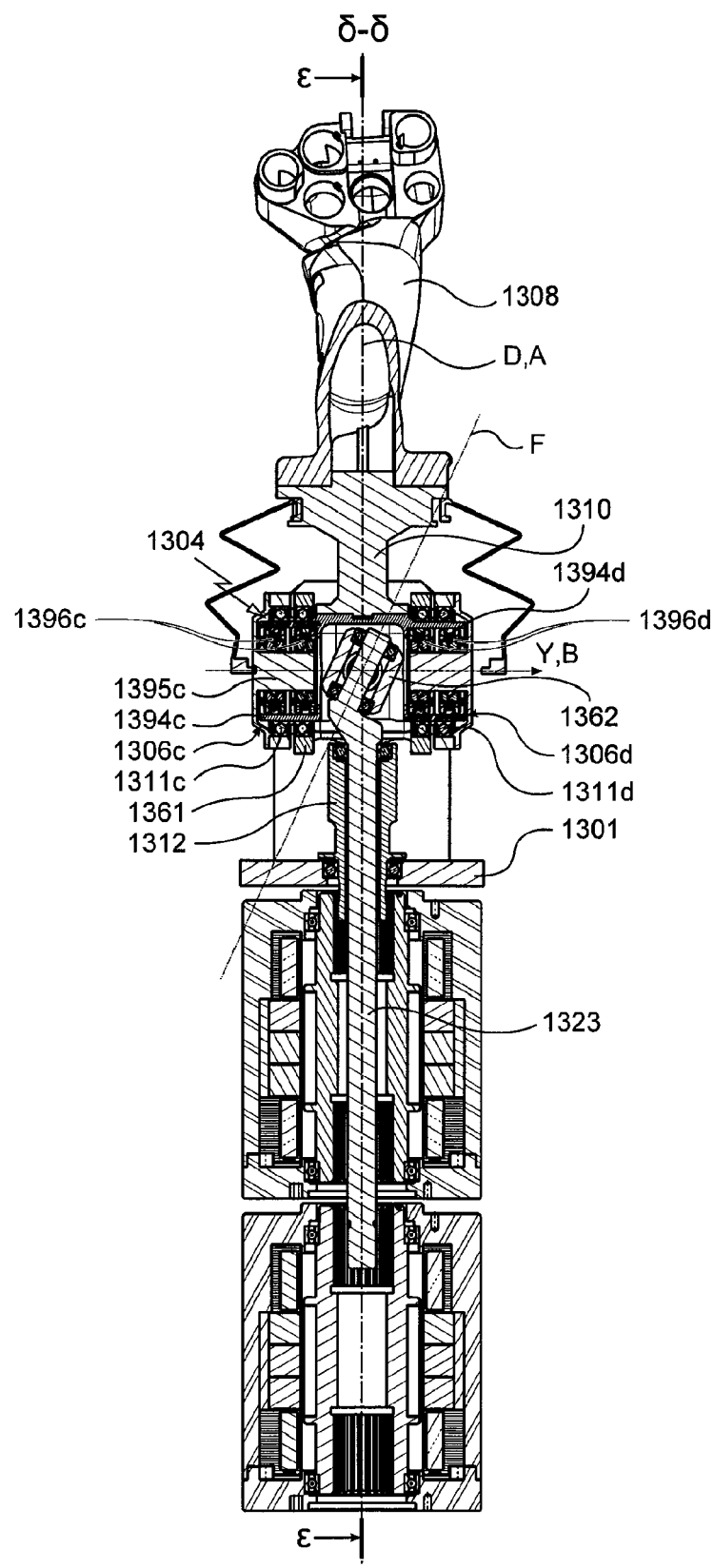
FIG. 18 is a cross-section view of the device shown in FIG. 16 on a section plane containing the axes Y and D shown diagrammatically in FIG. 16.

FIGS. 16 to 18 show a variant of the device of the fourth embodiment: the movements of the control lever about the first axis X and the second axis Y are sensed by means other than an association between a potentiometer and a toothed segment. Elements in common with the fourth embodiment are given the same numbers plus one thousand.

The first rocker 1304 is mounted on the stand 1301 via two rolling bearings 1305a, 1305b on a common axis, which bearings are mounted respectively on the opposite transverse walls 1303a, 1303b of the stand 1301. The first rocker 1304 has two through orifices 1391a, 1391b passing through respective ones of its transverse walls 1306a, 1306b, said two orifices lying on a common axis with the rolling bearings 1305a, 1305b, the orifices being smaller in diameter than said bearings. The stand 1301 includes respective fingers 1392a, 1392b on each of its transverse walls 1303a, 1303b, which fingers extend into the orifices 1391a, 1391b of the corresponding transverse walls of the first rocker 1304, and lie on the same axis as the two rolling bearings 1305a, 1305b, and thus with the two orifices 1391a, 1391b. Two sensor bearings are mounted between each finger of the stand 1301 and the corresponding orifice of the first rocker 1304, each sensor bearing incorporating an angle sensor. Each angle sensor 1393a, 1393b thus has a non-rotary portion connected to the corresponding finger of the stand 1301 and a rotary portion connected to the corresponding orifice of the first rocker 1304. Thus, for the pivot movements of the control lever 1308 about the first axis X, co-operation between the stationary and moving portions of the sensors makes it possible to sense the movement of the first rocker 1304 and thus of the control lever 1308 about the first axis X.

In the same manner, for the pivoting movements of the control lever 1308 about the second axis Y, the second rocker 1310 of the control lever 1308 is mounted on the first rocker 1304 via two rolling bearings 1311c, 1311d on a common axis that are secured respectively to the opposite longitudinal walls 1306c, 1306d of the first rocker 1304. The second rocker 1310 has two orifices 1394c, 1394d passing through respective ones of its longitudinal walls, said two orifices lying on the same axis as the bearings 1311c, 1311d, the orifices being smaller in diameter than said bearings. The first rocker 1304 has respective fingers 1395c, 1395d on each of its longitudinal walls 1306c, 1306d, which fingers extend inside the orifices 1394c, 1394d of the corresponding longitudinal walls of the second rocker 1310 and lie on the same axis as the two bearings 1311c, 1311d and thus as the two orifices 1394c, 1394d. Two bearings are mounted between each finger of the first rocker 1304 and the corresponding orifice of the second rocker 1310, each bearing incorporating an angle sensor. Each angle sensor 1396c, 1396d thus has a non-rotary portion connected to the finger of the corresponding first rocker 1304 and a rotary portion connected to the orifice of the corresponding second rocker 1310. Thus, for pivoting movements of the control lever 1308 about the second axis Y, co-operation between the stationary and moving portions of the sensors serves to sense the movement of the second rocker 1310, and thus of the control lever 1308, about the second axis Y.

Figure 13:
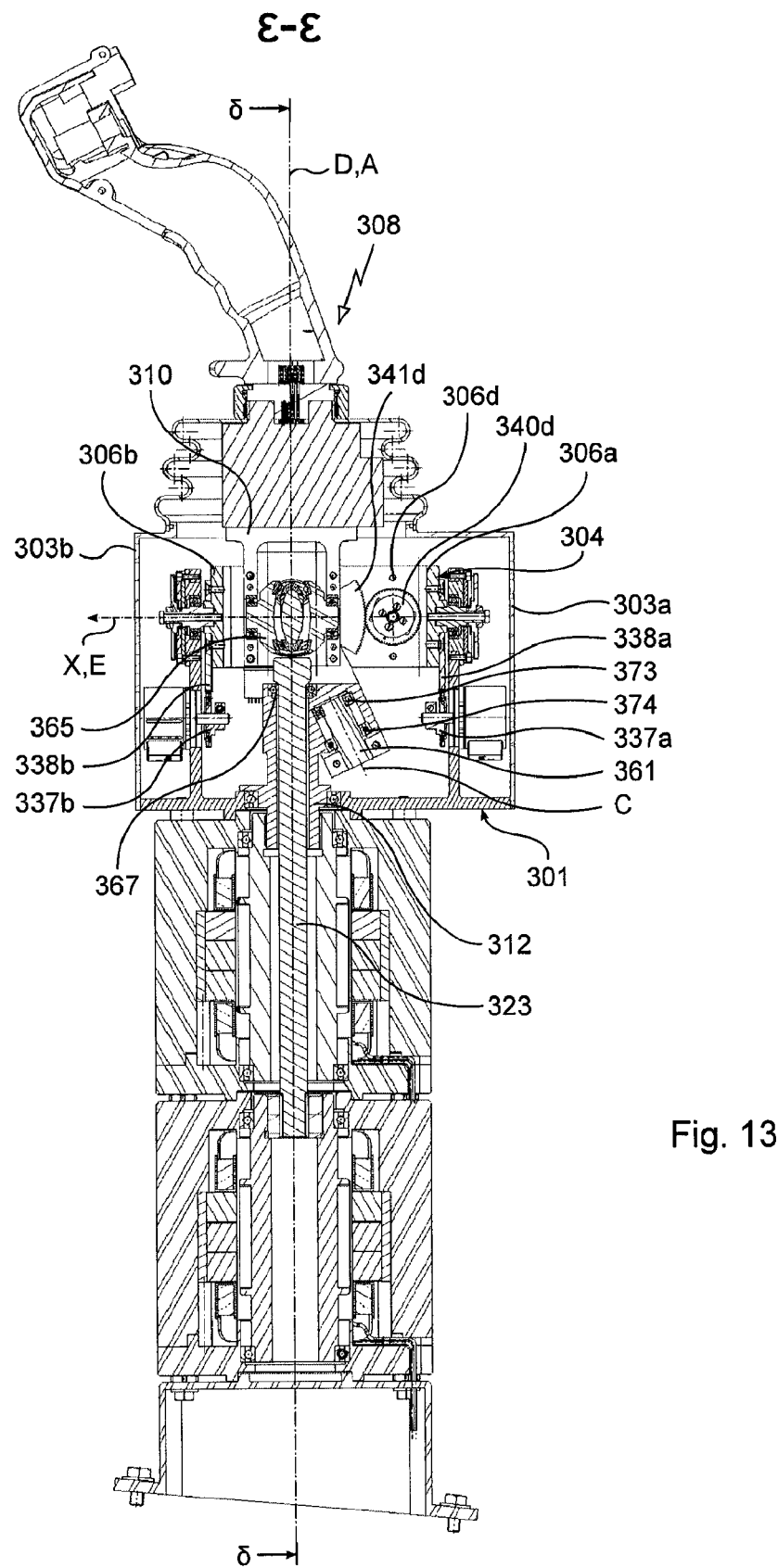
FIG. 13 is a longitudinal section view of the device shown in FIG. 12 on a section plane containing the axes X and D shown diagrammatically in FIG. 12.
Figure 14:
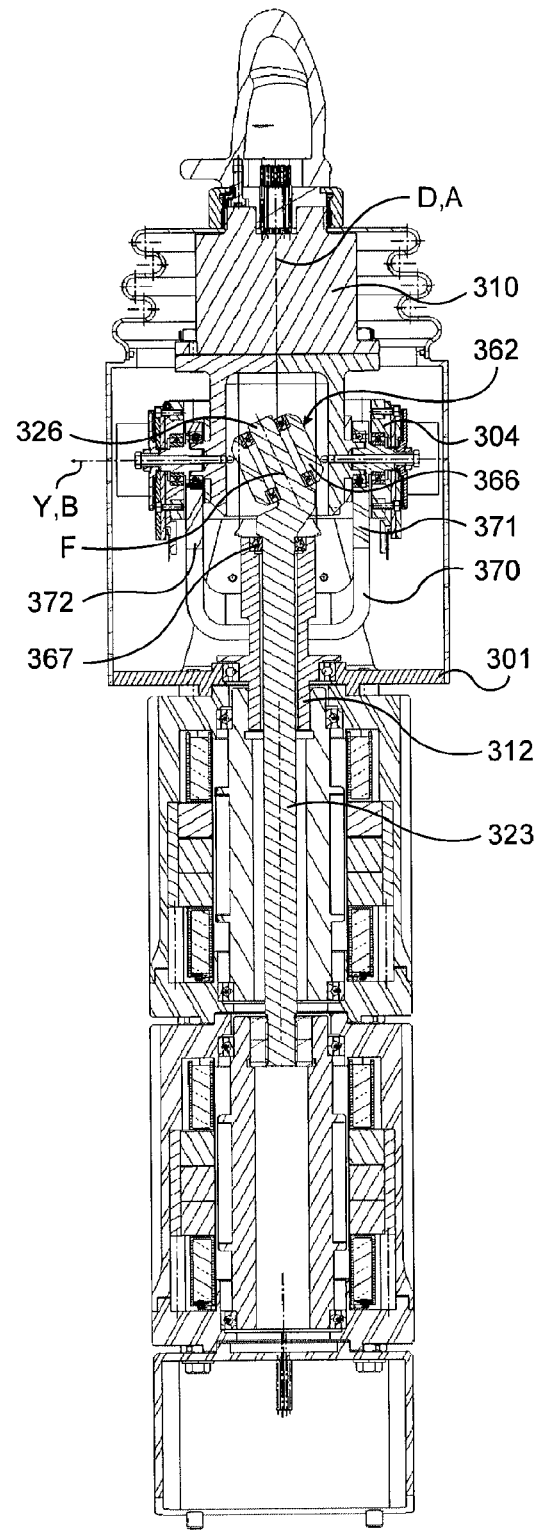
FIG. 14 is a cross-section view of the device shown in FIG. 12 on a section plane containing the axes Y and D shown diagrammatically in FIG. 12.
Figure 15:
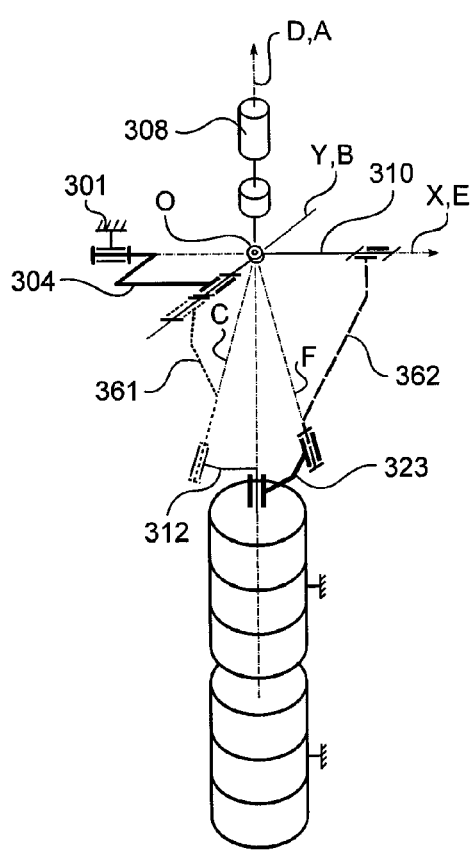
FIG. 15 is a diagram of the flight control device shown in FIG. 12.

Incorporating means for measuring pivoting movements of the control lever 1308 about the first and second axes X and Y at the rolling bearings serving respectively to provide pivot connections between the stand 1301 and the first rocker 1304 and the rolling bearings providing the pivot connection between the second rocker 1310 and the first rocker 1304 makes it possible to have a device of very small size (the difference can clearly be seen between FIGS. 13 and 17). In addition, the measurements of the pivot movements of the control lever 1308 about the first and second axes X and Y are more accurate. Finally, friction between the first rocker 1304, the stand 1301, and the second rocker 1310 is attenuated by the presence of bearings incorporated the angle sensors.

Figure 19:
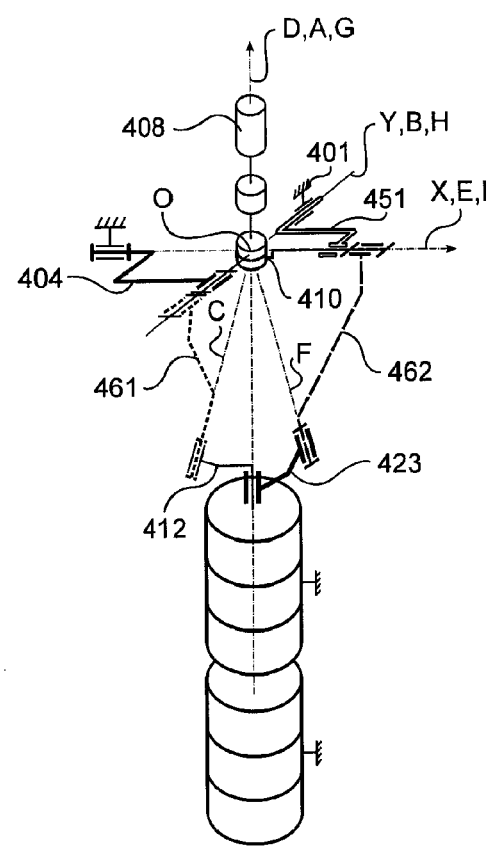
FIG. 19 is a diagram of a flight control device in a fifth embodiment of the invention.
Figure 20:
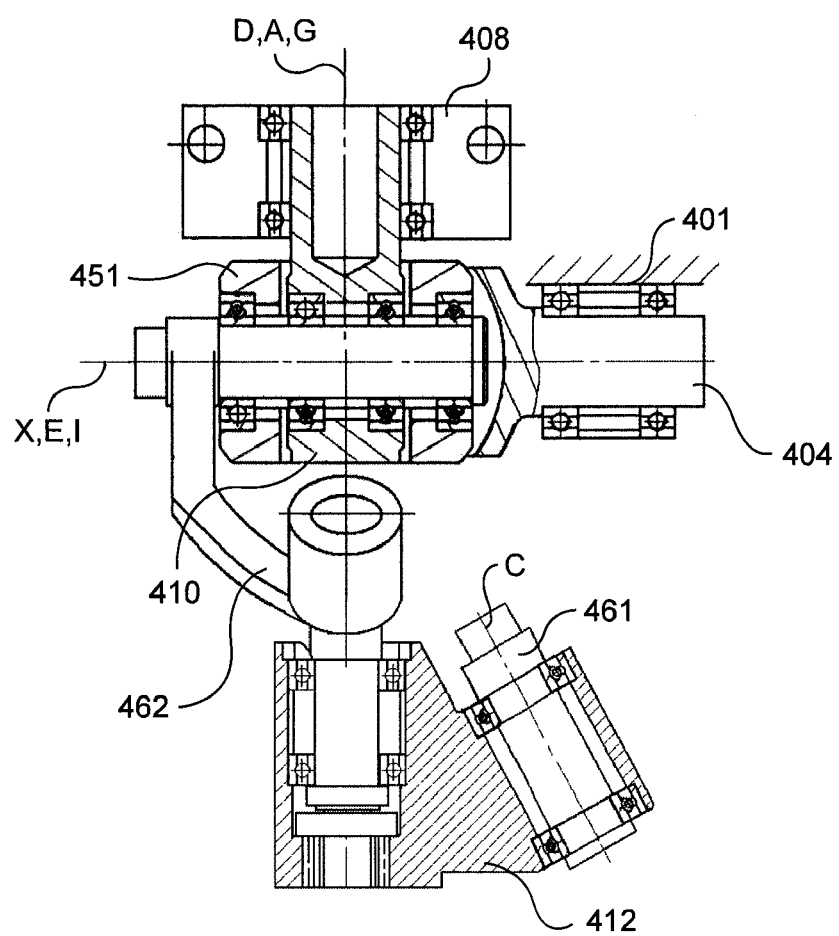
FIG. 20 is a fragmentary longitudinal section view of the device shown in FIG. 19 on a section plane containing the axes X and D shown diagrammatically in FIG. 19.
Figure 21:
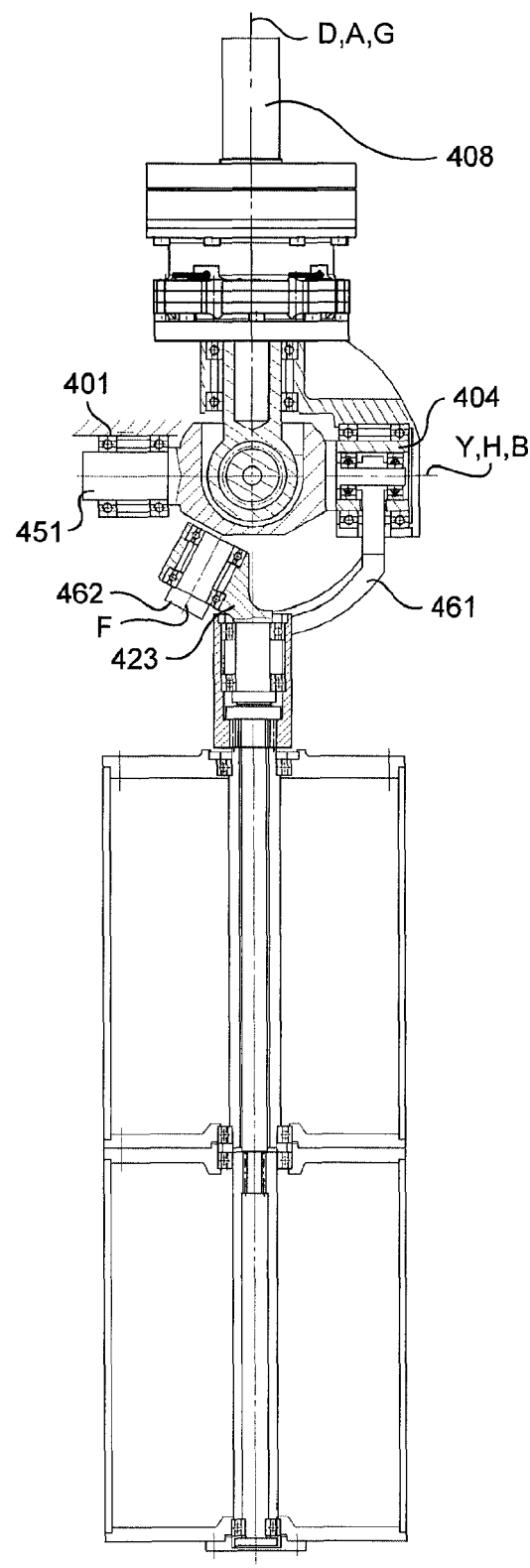
FIG. 21 is a cross-section view of the device shown in FIG. 18 on a section plane containing the axes Y and D shown diagrammatically in FIG. 19.

FIGS. 19 to 21 show a fifth embodiment of the invention. Elements in common with the fourth embodiment are given the same numbers plus one hundred and elements in common with the second embodiment are given the same numbers plus three hundred.

The connection between the control lever 408 and the first transmission shaft 412 is provided as in the fourth embodiment: a movement in rotation of the control lever 408 about the first axis X drives a movement in rotation of the first transmission shaft 412 about the third axis A via the first connection mechanism. Preferably, the first connection mechanism in this example comprises a first lever 461 having a first end pivotally mounted on the control lever 408 about the fourth pivot connection and a second end that is angled and that is pivotally mounted on the first transmission shaft 412 by the fifth pivot connection.

The connection between the control lever 408 and the second transmission shaft 423 is nevertheless different from the connection in the fourth embodiment, being substantially as in the second embodiment.

In the fifth embodiment, the control lever 408 is thus directly connected to the second rocker 410 by a ninth pivot connection about a ninth axis G that is normal to the plane containing the first axis X and the second axis Y. The ninth axis G in this example coincides with the sixth axis D and with the third axis A. The device also has a platform 451 directly connected to the stand 401 by a tenth pivot connection to pivot about a tenth axis of rotation H that coincides with the second axis Y. The second rocker 410 is itself directly connected to the platform 451 by an eleventh pivot connection about an eleventh axis I that coincides with the first axis X, in this example.

The second connection mechanism is thus directly mounted on the second rocker 410 via the seventh pivot connection to pivot about the first axis X. Nevertheless, the second transmission shaft 423 is indeed pivotally mounted directly on the second connection mechanism as in the fourth embodiment. In preferred manner, the second connection mechanism in this example includes a second lever 462 having a first end pivotally mounted on the second rocker 410 by the seventh pivot connection and a second end that is angled and that is pivotally mounted on the second transmission shaft 423 by the eighth pivot connection.

Thus, a movement in rotation of the control lever 408 about the second axis Y drives a corresponding movement in rotation of the second rocker 410, which in turn drives a movement in rotation of the second transmission shaft 423 about the sixth axis D via the second connection mechanism.

The device of the fifth embodiment is arranged in such a manner that all of the axes (first axis, second axis, third axis, fourth axis, fifth axis, sixth axis, seventh axis, eighth axis, ninth axis, tenth axis, and eleventh axis) are all concurrent at a single point O.

Thus, the stand 401 carrying the various main elements of the device is particularly compact.

Since the third and sixth axes coincide and the outlet shafts of the first and second motor groups lie on the third and sixth axes respectively, the outlet shafts of the first and second motor groups likewise lie on a common axis.

As a result, the motor groups are separate from the stand, and they are arranged so that both of them are under the floor of the stand 401, one under the other.

The device of the fifth embodiment enables the motor groups to be arranged relative to the stand in a manner that is novel and that is also particularly compact.

Unlike the first embodiment and the fourth embodiment, the device of the fifth embodiment enables the pivoting movement of the control lever 408 about the first axis X to be completely decoupled from the pivoting movement of the second transmission shaft 423 about the sixth axis D.

Naturally, the invention is not limited to the embodiments described and variations may be made thereto without going beyond the ambit of the invention as defined by the claims.

In particular, although the control lever is described as being connected to a first motor member and to a second motor member, it is possible to envisage that the control lever is connected to a third motor member for controlling movements in rotation of the control lever about an axis that intersects the first and second axes and that is normal to the plane formed by the first and second axes when the control lever is in the neutral position.

The term "neutral position" is used to mean in general manner the position of the control lever in which no force is exerted on the control lever, such that if the device for standing on a plane surface, the plane formed by the first axis and the second axis would be parallel to said surface.

Although in this example each motor member comprises a plurality of electric motors, the motor members could comprise any other means for generating mechanical torque. Thus, each motor member could comprise a triple motor instead of a motor group comprising three motors. Each motor member could comprise only a single motor.

Although in the first embodiment, the transmission shafts are directly connected to the outlet shafts of the corresponding motor groups, the transmission shafts in a variant could be connected to said outlet shafts via movement transmission devices. The transmission shafts could be connected to the outlet shafts of the motors by any known means other than fluting, such as bolted flanges.

Although in the first embodiment, the angled portion of one of the transmission shafts extends at 25 degrees relative to the remainder of the corresponding transmission shaft, the angled portion could be shaped in such a manner that the fifth axis (or the eighth axis) preferably extends in the range ]X; X[ degrees relative to the third (or sixth) axis. In the same manner, it is possible to adapt the angle of each angled portion of the levers of the fourth embodiment or of the fifth embodiment so as to obtain the desired angle of inclination of the fifth axis or of the eighth axis. In general manner, a particular shape should be selected for the connection mechanisms and/or for the transmission shafts in order to adapt the angle of inclination of the fifth axis and of the eighth axis.

Naturally, throughout the present application, when two parts are pivotally mounted relative to each other, the mounting may be direct (the two parts are then in contact) or via other parts.

One or the other of the parts connected by a pivot connection could equally well carry the rolling bearing(s) or any other means for making the pivot connection between the two parts.

The transmission shafts could be mounted to pivot relative to the stand about the third and sixth axes by being rotatably guided and mounted directly on the stand or by being rotatably guided and mounted on the stator of the corresponding control motor.

Although the pivot movements of the control lever about the first and second axes X and Y in the present examples are sensed by co-operation between a toothed segment and a potentiometer, these pivot movements could be measured in some other way. Angle sensors could thus be arranged directly in the motors in order to co-operate with the transmission shafts and measure the angular movements of the transmission shafts about the third and sixth axes A and D, which angular movements are directly linked to the pivoting movements of the lever about the first and second axes X and Y. Angle sensors could also be arranged in the rolling bearings that provide the pivot connections between two parts of the device, as described for the variant of the fourth embodiment.

The device preferably includes different means for measuring the pivoting movements of the control lever about the first axis X and/or the second axis Y. That makes it possible to compare the results provided by those different means: if too great a difference occurs, that might mean that some of the means have failed or that non-negligible slack exists between certain parts of the device.

The device could also include one or more force sensors for measuring the forces applied to the control lever by the pilot.

In the embodiments for which a movement of the control lever about the first axis X is lightly coupled to the pivoting movement of the second transmission shaft about the sixth axis D (as in the first embodiment, the fourth embodiment, and the variant of the fourth embodiment), the motor groups could be configured to compensate for the force return to the pilot operating the control lever so as to eliminate the sensation of coupling.

The first and second modes can enable the device of the invention to be incorporated in an armrest of a cockpit, in particular in a helicopter. The fourth mode and its variant and the fifth mode can enable the device of the invention to be incorporated in a column of a cockpit, in particular in a helicopter.

The various elements in common between the various above-described embodiments (the first embodiment, the second embodiment, the fourth embodiment, the variant of the fourth embodiment, and the fifth embodiment) are preferably identical, and in particular the motor groups and the rolling bearings are preferably identical. That makes it possible to make available for clients a plurality of different configurations that share numerous parts in common between the various configurations.

The invention claimed is:

1. A flight control device for an aircraft, the device comprising a control lever associated with a stand carrying:
   a rocker connected to the stand via a first pivot connection about a first axis, the control lever being connected to the rocker by a second pivot connection about a second axis that is substantially perpendicular to and intersects the first axis;
   a first transmission shaft pivotally mounted relative to the stand to pivot about a third axis and connected to at least a first control motor member separate from the stand;
   a first connection mechanism connecting the control lever to the first transmission shaft in such a manner that a movement in rotation of the control lever about the first axis produces a movement in rotation of the first shaft about the third axis;
   a second transmission shaft pivotally mounted relative to the stand to pivot about a fourth axis and connected to at least one second control motor member separate from the stand; and
   a second connection mechanism connecting the control lever to the second shaft so that a movement in rotation of the control lever about the second axis produces a movement in rotation of the second shaft about the fourth axis;
   the first shaft and the first connection mechanism being connected to each other by a pivot connection about a fifth axis that is inclined relative to the first axis and to the third axis; and the second shaft and the second connection mechanism being connected to each other by a pivot connection about a sixth axis that is inclined relative to the second axis and to the fourth axis.

2. The device according to claim 1, arranged in such a manner that the fourth axis is substantially normal to the plane defined by the first axis and the second axis when the control lever is in a neutral position or substantially coincides with the first axis.

3. The device according to claim 1, arranged in such a manner that the third axis is substantially normal to a plane containing the first axis and the second axis when the control lever is in a neutral position.

4. The device according to claim 1, arranged in such a manner that the first axis, the second axis, the fourth axis, and the sixth axis are substantially concurrent at a first point and the first axis, the third axis, and the fifth axis are substantially concurrent at a second point.

5. The device according to claim 1, arranged in such a manner that the first axis, the second axis, the third axis, the fourth axis, the fifth axis, and the sixth axis are all concurrent at a single point.

6. The device according to claim 1, arranged in such a manner that the third axis and the fourth axis are substantially parallel and both substantially normal to the plane defined by the first axis and the second axis when the control lever is in a neutral position.

7. The device according to claim 6, wherein the first mechanism is arranged to connect the first shaft to the control lever via the rocker.

8. The device according to claim 1, arranged in such a manner that the third axis and the fourth axis are substantially perpendicular to each other.

9. The device according to claim 1, arranged in such a manner that the third axis and the fourth axis substantially coincide and are substantially normal to the plane containing the first axis and the second axis when the control lever is in a neutral position.

10. The device according to claim 1, including a platform connected to the stand by a seventh pivot connection about the second axis, and a second rocker that is itself connected to the platform by an eighth pivot connection about the first axis, the control lever then being connected to the second rocker by a ninth pivot connection about a ninth axis that is substantially concurrent with the first axis and with the second axis and that is substantially normal to the plane containing the first axis and the second axis when the control lever is in a neutral position.

11. The device according to claim 10, wherein the second mechanism is arranged to connect the second shaft to the control lever via the platform.

* * * * *